Jan. 17, 1961 C. H. FRICK 2,968,193
POWER PLANT GOVERNOR CONTROL SYSTEM
Filed June 4, 1959 5 Sheets-Sheet 1

INVENTOR
Charles H. Frick
BY
L. D. Burch
ATTORNEY

INVENTOR
Charles H. Frick
BY
ATTORNEY

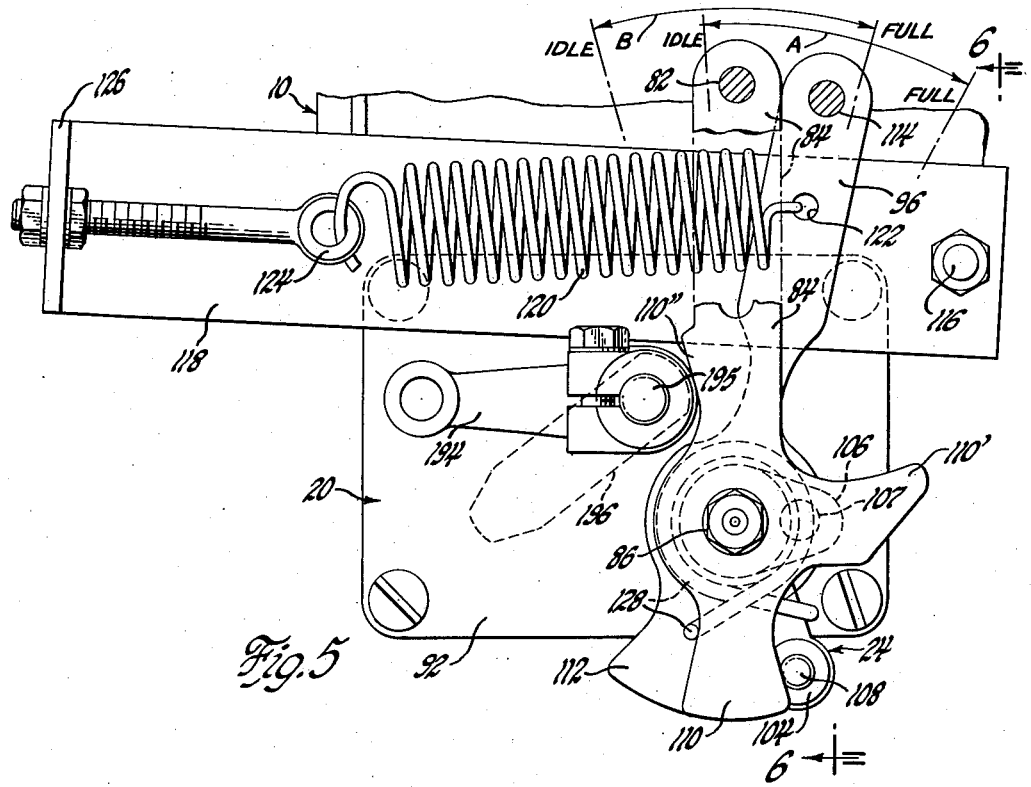
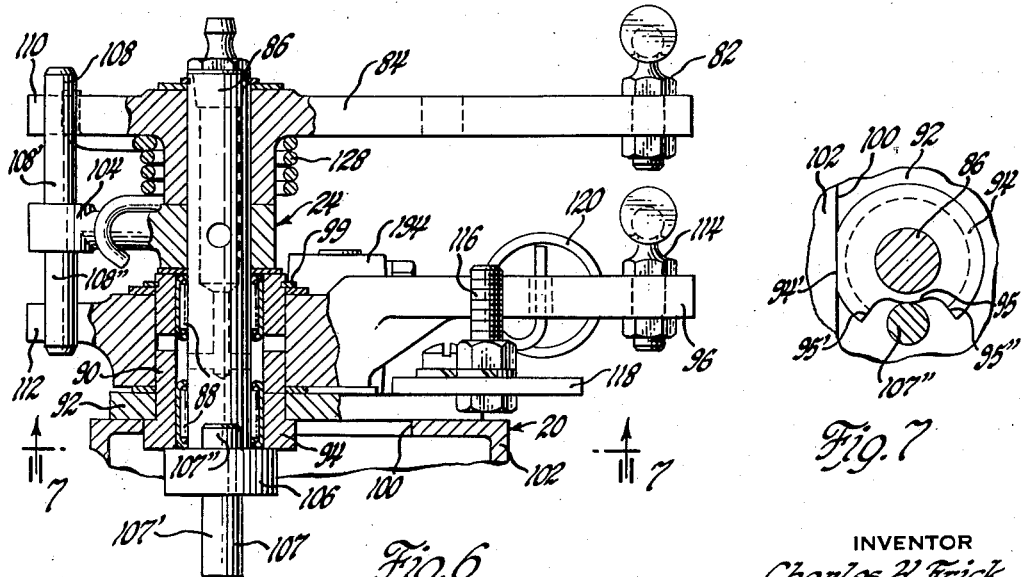

Jan. 17, 1961 C. H. FRICK 2,968,193
POWER PLANT GOVERNOR CONTROL SYSTEM
Filed June 4, 1959 5 Sheets-Sheet 4
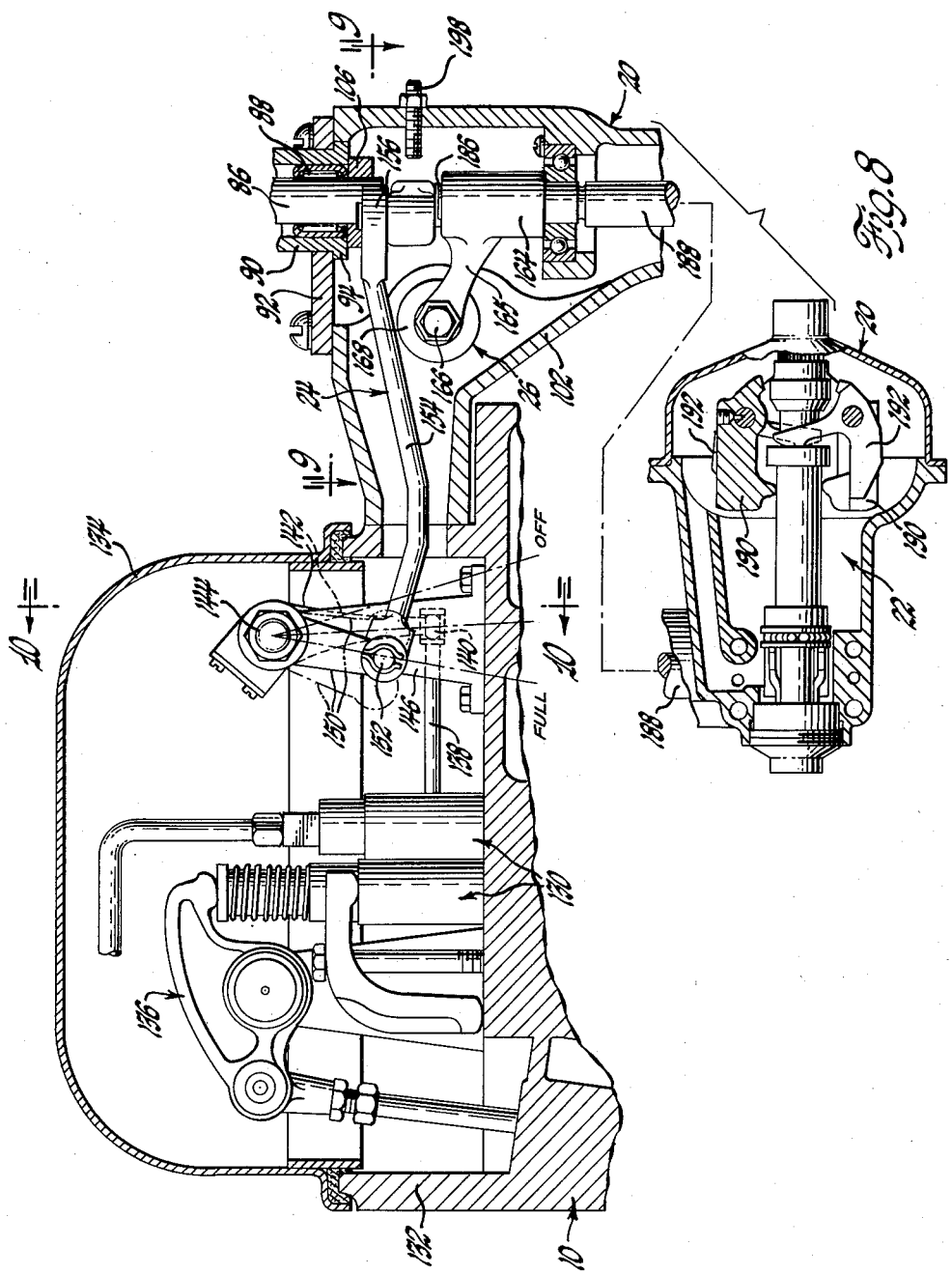
INVENTOR
Charles H. Frick
BY
S. D. Burch
ATTORNEY Jan. 17, 1961 C. H. FRICK 2,968,193
POWER PLANT GOVERNOR CONTROL SYSTEM
Filed June 4, 1959 5 Sheets-Sheet 5

INVENTOR
Charles H. Frick
BY
ATTORNEY

United States Patent Office 2,968,193
Patented Jan. 17, 1961

2,968,193

POWER PLANT GOVERNOR CONTROL SYSTEM

Charles H. Frick, Pontiac, Mich., assignor to General Motors Corporation, Detroit, Mich., a corporation of Delaware Filed June 4, 1959, Ser. No. 818,094

4 Claims. (Cl. 74—472)

This invention relates to an output speed and power control mechanism for an internal combustion engine power plant including a power transmitting coupling device having speed droop characteristics under increasing load, e.g. torque converter and eddy current type couplings.

In power plants of the above-mentioned type, the rate of operation of the engine tends to decrease with increased application of load and the rate of operation of the coupling output shaft tends to further decrease due to the inherent slippage characteristics of such couplings. If permitted, these combined droop characteristics result in an accumulative reduction in the power available at the output shaft. It is therefore desirable to modify the speed droop characteristic of the engine to maintain desired load operating speed and thereby increase the load operating power available at the output shaft. For this purpose, the engine fuel supply is generally regulated by a variable speed governor which is operable on the engine fuel supply means to maintain the speed of the power transmitting output shaft at a speed selected by the power plant operator. However, in certain applications it is desirable to permit the engine to drive the load imposed thereon at relatively slow speeds, to hold the load at zero speed, and to permit reverse load travel. Such load operating conditions are not normally permitted by the fuel controlling operation of the tailshaft responsive variable speed governor. It is therefore necessary to provide operator-controlled means operable to selectively override the operation of the output shaft governor and act directly on the engine fuel supply control means to provide the desired load driving operation.

The invention contemplates an improved governor control system for an internal combustion engine power plant of the type described wherein an engine speed responsive governor means is operable on an associated engine fuel control means to limit maximum and minimum speeds of the engine while permitting operation of the fuel control means to control engine speed between such governor established limits and a variable speed governor means responsive to the driven speed of the coupling output shaft and normally operable on the engine fuel supply means to regulate the speed and power output of the engine to provide a desired output shaft speed corresponding to an operator imposed speeder spring adjustment of the output shaft responsive governor means. The invention is more specifically directed to an improved linkage control mechanism interconnecting the engine fuel control means, the engine limiting speed governor and the variable output shaft speed controlling governor and provides for operator overrule of the fuel controlling action of the output shaft governor in a decreasing speed and power direction without substantial operator effort and independently of the speed responsive output of the output shaft governor.

The foregoing and other objects, advantages and features of the invention will be more thoroughly understood and apparent from the following description of a preferred embodiment of the invention in which reference is made to the accompanying drawings, in which:

Figure 5 is a fragmentary top elevational view of the engine limiting speed governor and shows the output shaft governor connection with the engine fuel control linkage and the operator controlled overrule mechanism;

Figure 6 is a fragmentary elevational view of the engine fuel control linkage taken substantially in the direction of the arrows 6—6 in Figure 5 with portions thereof broken away and in section;

Figure 7 is a fragmentary view taken substantially in the plane of the line 7—7 in Figure 6;

Figure 8 is a fragmentary and composite sectional view showing the engine limiting speed governor and fuel control mechanism with the upper portion thereof being taken transversely of the engine substantially in the plane of line 8—8 in Figure 1 and the lower portion thereof being taken in a longitudinal plane normal thereto;

Figure 1:
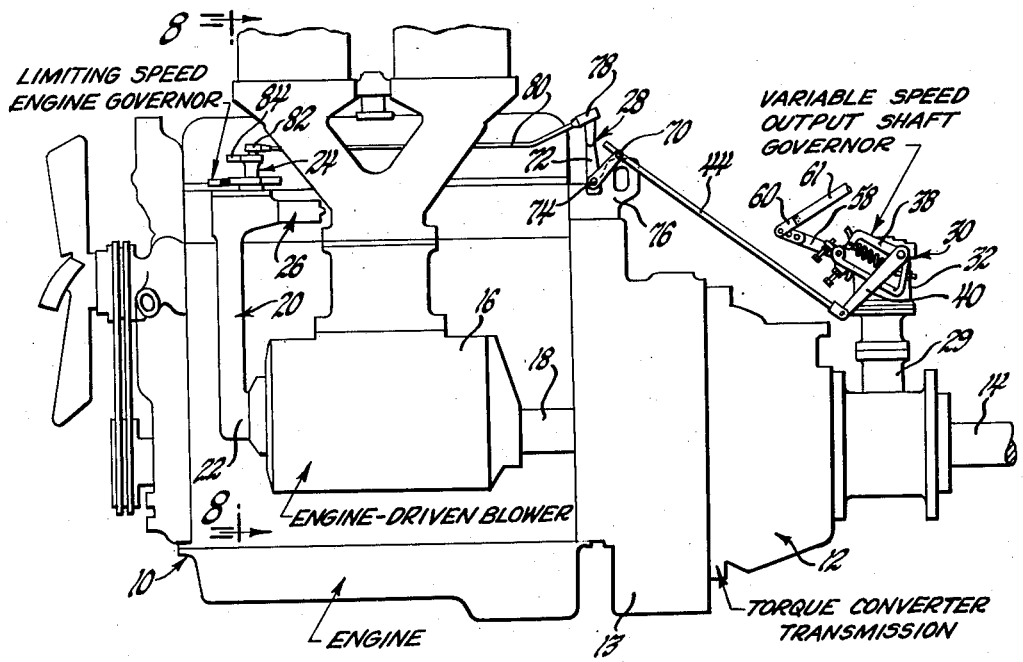
Figure 1 is a side elevational view of an internal combustion engine power plant of the type described embodying a control mechanism constructed in accordance with the invention.
Figure 2:
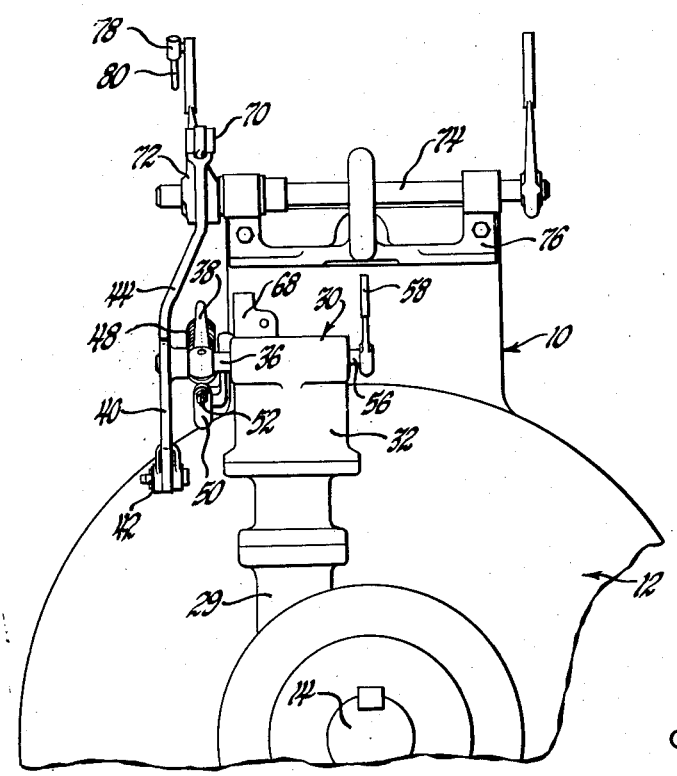
Figure 2 is a fragmentary view showing the power plant of Figure 1 in rear elevation.
Figure 3:
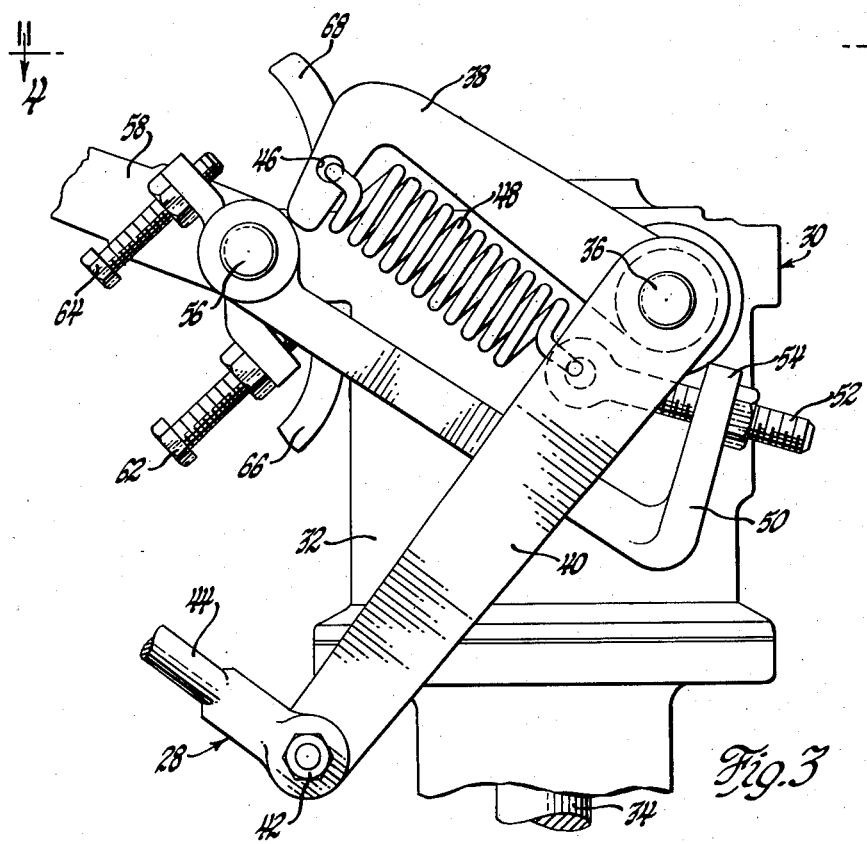
Figure 3 is an enlarged view corresponding to a portion of Figure 1 and showing the variable speed output shaft responsive governor in greater detail.
Figure 4:
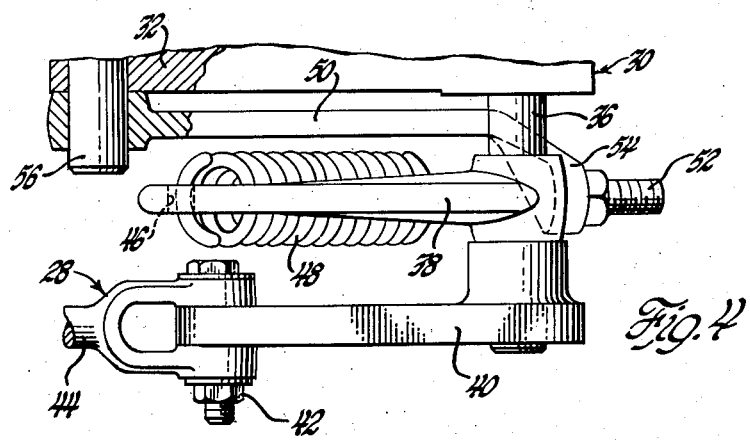
Figure 4 is a fragmentary top elevational view taken substantially in the direction of the arrows 4—4 in Figure 3 and shows the power output lever and speeder spring adjustment of the output shaft governor in greater detail.

Referring more particularly to the drawings, Figures 1 and 2 show a power plant including an internal combustion engine 10 which is shown as a two-cycle diesel engine for illustrative purposes. The engine 10 is drivingly connected through a power transmitting mechanism 12 including a torque converter fluid coupling 13 to an output shaft 14 which is drivingly connectable to various loads. Pressurized scavenging and combustion air is supplied to an engine air box by a blower 16 which is drivingly connected to the engine by a suitable drive means indicated at 18. An engine speed limiting governor 20 includes a lower centrifugal flyweight mechanism 22 which is supported by and suitably driven off the engine driven blower. As explained in greater detail below, the flyweight mechanism 22 is operable through a power shaft extension to bias a fuel supply controlling linkage means 24 in a decreasing fuel direction in opposition to a speeder spring assembly 26 to maintain desired minimum and maximum engine speed limits. Intermediate such governor maintained engine speed limits, actuation of the fuel control linkage 24 is normally effected through a linkage 28 which is operably connected to and controlled by a variable speed governor 30. The governor 30 is responsive to the speed of the output shaft 14 being drivingly connected thereto by suitable means indicated at 29.

The governor 30, as shown in Figures 1–4, comprises a housing 32 which is suitably mounted on the rear of the power transmitting mechanism 12. A shaft 34 is rotatably journaled within the housing and is drivingly connected to the output shaft 14 by a suitable bevel gear drive, not shown. A conventional centrifugal flyball governor mechanism, not shown, is mounted on the drive shaft 34 within the housing. An output shaft 36 is journaled in the housing transversely to the shaft 34 and is operably connected to the flyweight mechanism to be rotated in a clockwise direction, as viewed in Figures 1 and 3, as the flyweights are caused to move outwardly in response to the speed of the output shaft. Two angularly disposed lever arms 38 and 40 are secured to one end of the output shaft 36, which projects outwardly of the governor housing, for speed responsive movement therewith. The end of the lever arm 40 distal from the shaft 36 is pivotally connected as indicated at 42 to the clevis end of a floating link 44. The link 44 comprises a part of the linkage 28 which extends between the two governors. The end of the lever arm 38 distal from the shaft 36 is provided with a lateral extension having a hole 46 therein securing one end of a tensive speeder spring 48. The opposite end of the speeder spring 48 engages an eyebolt 52 which is carried by and is threadably adjustable with respect to a lateral extension 54 of a speeder spring adjusting lever 50. The opposite end of the lever arm 50 is secured to a projecting end of a shaft 56 which is journaled in and extends through the governor housing 32 in spaced parallel relation to the governor output shaft 36. A second lever arm 58 is secured to the opposite projecting end of the shaft 56 which thus serves as a pivot connection intermediate the speeder spring adjusting lever arms 50 and 58. The end of the lever arm 58 opposite the shaft 56 is pivotally connected at 60 to the clevis end of a control link 61 which may be shifted manually through suitable accelerator control linkages, not shown. The shaft connected end of the lever 50 is provided with two lugs which threadably mount two stop screws 62 and 64. The screws 62 and 64 are engageable with two abutment wings 66 and 68, respectively, which may be formed integrally with or secured to the governor housing and thus form adjustable stops limiting the pivotal speeder spring adjusting movement of the lever arms 50, 58 and thereby the minimum and maximum output shaft speed maintaining bias which may be imposed on the speeder spring 48.

The end of the link 44 distal from its connection with the power output lever 40 is pivotally connected at 70 to a first arm of a bell crank lever 72. The bell crank lever 72 is mounted on one end of a rockshaft 74 which is journaled in and extends transversely of a mounting bracket 76 secured to the rear of the engine. A second arm of the bell crank lever 72 is pivotally connected at 78 to one end of a link 80. The other end of the link 80 is pivotally connected at 82 to one arm of a throttle pickup lever 84.

As best seen in Figures 5 and 6, the throttle pickup lever 84 is pivotally journaled on the upper end of a throttle control shaft 86. The shaft 86 is in turn journaled by spaced needle bearings 88 carried by and housed within a bearing sleeve 90. The bearing sleeve 90 extends through an opening provided therefor in a plate 92 and is provided with a radial flange 94 defining a shoulder abuttable with the lower side of the plate 92. An operator-controlled overrule lever 96 is pivotally journaled on the upper external surface of the bearing sleeve 90 being retained thereon by a snap ring 99. The bearing sleeve 90 is thus assembled in flange abutting relation to the plate 92. The plate 92 constitutes a cover plate closing an opening 100 provided in the upper portion of the housing 102 of the engine limiting speed governor. In the embodiment shown, the flange 94 of the bearing sleeve 90 is provided with a flat side surface 94' which engages the adjacent side face of the flange defining the governor housing opening 100 and locks the sleeve in a given non-rotative angular relation with respect to the governor housing and cover plate.

A throttle control lever arm 104 is secured to the shaft 86 intermediate the throttle pickup lever 84 and the bearing sleeve 90 and a second lever arm 106 is secured to the end of the shaft 86 projecting within the governor housing 102. The end of the lever arm 104 distal from its mounting on the shaft 86 carries a vertical pin 108 which has an upper portion 108' engageable with an arm 110 of the governor-controlled throttle pickup lever 84 and a lower portion 108" engageable with a pickup arm 112 provided on the operator-controlled overrule lever 96. The lower throttle control lever arm 106 similarly carries a pin 107 which is radially offset of the pivot axis of the shaft 86. A downwardly extending portion 107' of the pin 107 is engageable with and operable to control the fuel regulating position of the remainder of the fuel control linkage 24 as explained in greater detail below. As shown in Figure 7, a second upwardly extending pin portion 107" is engageable with radially extending shoulders 95' and 95" which define the ends of a slot 95 extending arcuately of the bearing sleeve flange 94. The shoulders 95' and 95" thus provide idle and full fuel supply control limits, respectively, limiting the fuel controlling movement of the throttle control lever comprising the shaft 86 and the lever arms 104, 106.

The overrule lever 96 is pivotally connected at 114 to a suitable operator-controlled linkage, not shown, and is movable through a fuel supply control quadrant A, as indicated in Figure 5, which is dictated by the throttle control limit stops 95' and 95". Under certain operating conditions, hereinafter referred to as normal operating conditions, the last-mentioned operator-controlled linkage is utilized to actuate the overrule lever 96 beyond its indicated full fuel control position and into abutment with an upstanding stop screw or stud 116. The stop screw or stud 116 is carried by one end of a bracket member 118 which is secured to the governor housing and cover plate by the cover securing screws, as shown. Movement of the lever 96 to this position is in opposition to a helical spring 120, one end of which is secured at 122 to the lever 96 and the other end of which is secured to an eyebolt 124 which is carried by and threadably adjustable with respect to a flange 126 extending upwardly from the end of the bracket member 118 opposite the stop stud 116. To maintain the overrule lever 96 in its stop abutting position against the biasing action of the spring 120, the operator-controlled linkage connected thereto necessarily includes a conventional friction or detent brake device, not shown. When in such stop abutting position, the pickup arm 112 of the overrule lever is incapable of engaging the lower pin portion 108" to adjust the fuel controlling position of the throttle control lever 104.

Under such normal operating conditions, the throttle control lever arm 104 is biased in an increasing fuel direction bringing the upper portion 108' of the pin 108 into engagement with the pickup arm 110 of the governor-controlled lever 84. This biasing action is provided by a helical spring 128 which embraces the hub of the lever 84 and acts in torsion between the lever arms 104 and 110. The position of the throttle pickup lever 84, as controlled by the variable speed output shaft governor 30, thus controls the position and movement of the throttle control lever 104 under normal operating conditions.

Figure 10:
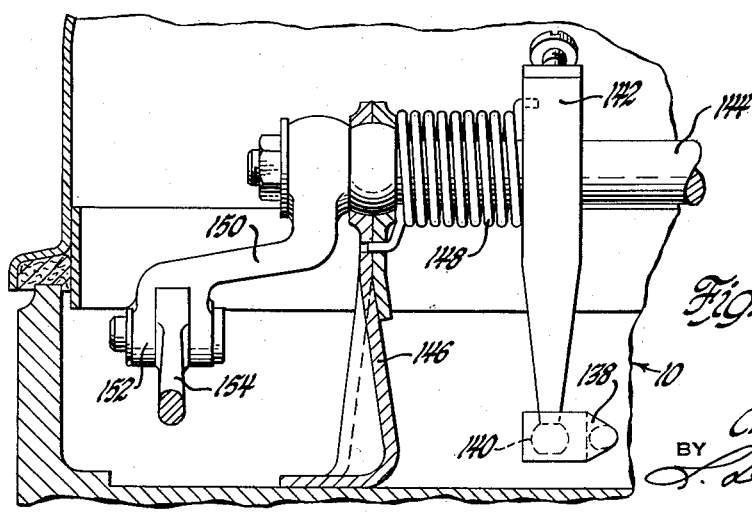
Figure 10 is a fragmentary sectional view of a portion of the engine fuel control mechanism taken substantially in the plane of the line 10—10 of Figure 8.

As best seen in Figure 8, the engine fuel control means includes a unit fuel injector 130 for each of the engine cylinders. The injectors 130 are mounted in the cylinder head 132 of the engine beneath cover member 134 and are individually operable by conventional actuating mechanisms indicated generally at 136 to supply oil fuel to the several cylinders in timed sequence. The quantity of fuel supplied by each of the injectors 130 is controllable in a conventional manner by rotation of a pinioned valve plunger or sleeve, not shown, by reciprocation of an injector rack 138 between a fuel off position and a full fuel supply position. Such fuel supply controlling reciprocation of the several injector racks is accomplished either by manual or governor actuation of the fuel control linkage 24 which is connected thereto. The ends of injector racks 138 remote from the injectors 130 each have a pivotal tongue and groove connection 140 with the lower end of a lever arm 142. The upper ends of the lever arms 142 are secured in longitudinally spaced relation to an injector control tube or shaft 144 which is suitably journaled above the cylinder head by a plurality of longitudinally spaced brackets 146. As shown in Figure 10, a helical spring 148 embraces the control tube 144 and is torsionally interposed between the support bracket 146 and the injector control lever arm 142 adjacent the governor end of the shaft. This spring biases the control tube 144 in a decreasing fuel direction and is capable of maintaining the control tube and the several injector racks connected thereto in their no fuel supply positions during engine shutdown periods.

Figure 9:
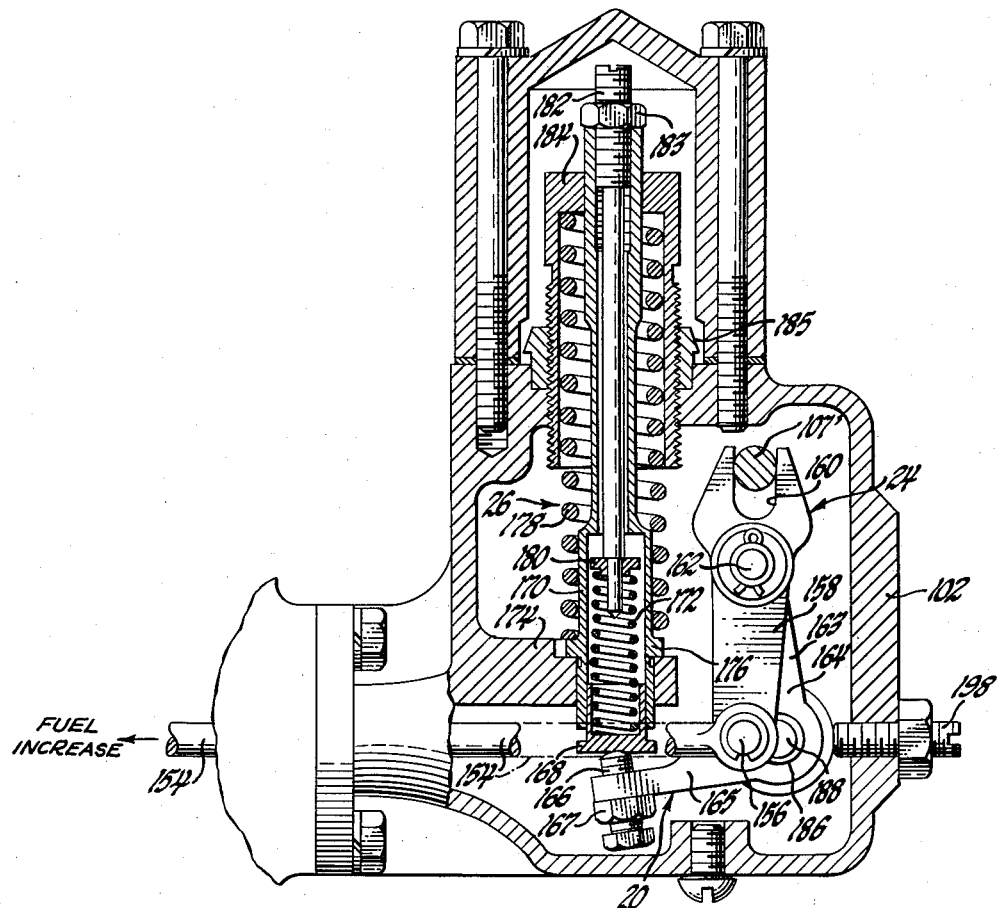
Figure 9 is a fragmentary sectional view of the engine governor and fuel control mechanism taken substantially in the plane of the line 9—9 of Figure 8.

A control tube oscillating lever arm 150 is secured to the end of the control tube 144 outboard of its mounting bracket 146 and is pivotally connected at 152 to one end of a fuel control link 154. The link 154 extends into an upper compartment defined by the governor housing 102 through an opening provided in an upstanding side wall of the cylinder head and is pivotally connected at 156 to one end of a floating differential lever 158. The opposite end of the lever 158 is provided with a groove or slot 160 providing a slidable pivotal connection with the lower pin portion 107' carried by the throttle control lever arm 106. The lever 158 is operably connected to the engine limiting speed governor 20 which is adapted to regulate its fuel controlling movement by the throttle control levers 104, 106 to limit the minimum and maximum speed operating limits of the engine. As best seen in Figure 9, this operable connection between the fuel controlling differential lever 158 and the limiting speed governor is provided by pivotally mounting the lever 158 intermediate its ends on a first arm 163 of an engine speed responsive bell crank lever 164 of the engine governor mechanism.

A second arm 165 of the bell crank lever 164 is provided with an adjusting screw 166 which is threadably mounted therein. The screw 166 is in endwise thrust engagement with a spring cap 168 of the governor speeder spring assembly 26 which tends to rotate the bell crank lever 164 in a counterclockwise, fuel-increasing direction as viewed in Figure 9. The spring cap 168 is reciprocably mounted within a cylinder bore provided in a high-speed plunger element 170 and forms a seating member for a low-speed speeder spring 172 mounted within the plunger bore. The plunger element 170 is in turn reciprocably mounted in a bore provided therefor and extending through a web 174 formed integrally within the governor housing 102. A flange 176 on the plunger element 170 forms a spring seat for one end of a high-speed speeder ring 178. The flange 176 also limits the axial movement of the plunger in a fuel increasing direction so that a minimum engine speed gap is provided between the cap 168 and the end of the high-speed plunger. This gap is shown in Figure 9 and is the distance which the cap 168 can move axially in a fuel decreasing direction before the flange formed radially thereon engages the cylindrical end of the plunger 170. This gap permits the low-speed spring 172 to maintain the speed of the engine above a desired minimum value. The other end of the low-speed speeder spring 172 is seated against a washer 180 carried by a low-speed speeder spring adjusting screw 182. The screw 182 is in turn carried by the distal end of the high-speed plunger 170 which is reciprocably mounted in a bore provided in a high-speed speeder spring retaining cap 184. The cap 184 serves as a seat for the end of the high-speed speeder spring opposite the flange 176 and is externally threaded to engage a tapped opening in the governor housing 102 thus providing means for adjusting the high-speed speeder spring. The speeder spring adjusting members 182 and 184 and the adjusting screw 166 are respectively provided with suitable lock nuts 183, 185 and 167.

Intermediate its arms 163 and 165 the bell crank lever 164 is suitably secured at 186 to the upper end of the output shaft 188 of the limiting speed governor mechanism 20. The shaft 188 is suitably journaled in the governor housing and is operably connected at its lower end to the engine-driven flyweight mechanism 22 which is of a conventional limiting speed construction. The centrifugal flyweight mechanism 22 includes low-speed and high-speed centrifugal weights 190 and 192, respectively, which are adapted to swing radially outwardly in opposition to the governor speeder spring assembly 26 when the engine exceeds minimum and maximum engine speed limits established by the speeder spring assembly. When the centrifugal forces acting on the flyweight mechanism 22 cause the weights to move radially outwardly, the shaft 188, the bell crank lever 164 and the differential lever mounting pivotal connection 162 carried thereby are rotated in a clockwise direction as viewed in Figure 9. Such rotation is in opposition to the speeder spring assembly 26 and imparts a counterclockwise rotation of the floating lever 158 thus causing it to actuate the fuel control link 154 in a fuel decreasing direction to maintain either the minimum or maximum engine speed.

Referring once again to Figure 5, a manually operable shutdown lever 194 is secured to the upper end of a second shaft 195 which is journaled in the governor housing cover plate 92. A second lever arm 196 is secured to the lower end of the shaft 195 within the governor housing. This second lever arm is in the plane of the fuel controlling differential lever 158 and is adapted to engage and carry the lever 158 in a decreasing fuel, counterclockwise direction as viewed in Figures 5 and 9. Rotation of the lever 194 to its indicated "stop" position carries the pivot end 156 of the lever 158 into abutment with the end of a stop screw 198 threadably mounted in the side wall of the governor housing 102. Movement of the lever 158 to this position effects engine shutdown by carrying the fuel controlling link 154 and the injector control tube 144 and the several injector racks 138 connected thereto to their fuel shutoff positions.

In normal operation, after the operator has actuated the overrule lever 96 into brake maintained abutment with the stop pin 116, fuel supply controlling position of the throttle control lever 104 is regulated by the output shaft speed responsive movement of the lever 84 to maintain the desired output shaft speed as established by operator adjustment of the biasing action of the speeder spring 48 of the output shaft governor 30. By releasing the manual overrule lever 96 to a control position intermediate its indicated idle and full-speed positions, as shown in full lines in Figure 5, the operator can establish any desired power output limit beyond which the output shaft governor is rendered ineffective to further advance the throttle control lever 104. When the output shaft speed responsive control position of the lever 84 is in a fuel supply control position in advance of that permitted by the intermediate control position being effected by the lever 96, the arm 112 of the lever 96 engages the lower pin end 108" and carries the throttle control lever 104 to a corresponding decreased fuel supply control position. Such overrule movement of the throttle control lever 104 is of course opposed by the biasing action of the torsion spring 128 but is assisted by over-powering action of the return spring 120. As movement of the lever 96 to such an intermediate position is assisted by the spring 120, any lost motion present in the actuating linkage is eliminated. Such spring return of the lever also permits the actuation of the lever 96 by either a Bowden wire or pulley-cable connection.

It should be noted that the minimum biasing action imposed on the lever 96 by the spring 120 is necessarily in excess of any biasing action which might be imparted to the throttle control lever 104 by the torsion spring 128 by movement of the lever 84 out of engagement with the pin 108. Similarly, the initial biasing stress imposed on the torsion spring 128 exceeds the biasing action of the injector tube return spring 148. Such proportioning of the several springs of the fuel controlling linkage and lever mechanism 24 prevents reverse actuation between the several elements.

As indicated above, the desired output shaft speed is obtained by adjusting the speeder spring 48 of the output shaft governor under normal operating conditions. However, the minimum output shaft speed permitted by such an output shaft governor is necessarily greater than the minimum engine idle speed. With reduction in output shaft speed beyond the minimum speed provided by the stop screw 62, the output shaft governor tends to advance the fuel control linkages 28, 24 in an increasing fuel direction. To reduce, hold or reverse the output shaft speed beyond this limit, the manual control lever 96 is permitted to be returned in a counterclockwise direction under the spring power afforded by the spring 120, as viewed in Figure 5, thereby overruling the fuel controlling operation of the output shaft governor and carrying the throttle control lever 104 to a reduced fuel controlling position permitting the desired load driving condition.

Under certain operating conditions, it may be desired to have direct throttle control of the engine. To provide for such operation, the speeder spring adjusting lever 58 of the output shaft governor is adjusted to its maximum output shaft speed position. When thus adjusted, the output shaft governor maintains the throttle pickup lever 84 in its full fuel position and the operator is thus permitted to directly control the fuel supply regulating position of the throttle control lever 104 by underriding actuation of the lever 96 between its idle and full fuel positions.

Referring once again to Figure 5, it will be noted that the lever 84 is of a configuration to provide an alternative throttle pickup arm 110' and an alternative throttle pickup boss 110". These alternatives permit modification of the linkage 28 intermediate the output shaft governor and the throttle control head on the engine governor to accommodate various installations.

While the foregoing description has been confined to one preferred embodiment of the invention, it will be understood by those skilled in the art that various modifications might be made therein without departing from the spirit and scope thereof as defined in the following claims.

I claim:

1. In a power plant including an engine and a power transmitting mechanism having an output shaft connectable to drive a variable load and having operating characteristics whereby the rate of operation of the output shaft tends to decrease under load more rapidly than the rate of operation of said engine, a control mechanism comprising fuel supply means for supplying variable amounts of fuel to said engine and including a control member movable between a minimum fuel supply control position permitting engine operation at an idling speed and a full fuel supply control position permitting engine operation under maximum speed and load conditions, a first spring means biasing said control member toward its full fuel supply position, a first lever connected to and operable to move said control member between its minimum and full fuel supply positions, a second lever engageable with and operable to carry said first lever in a decreasing fuel direction, a second spring means interposed between said first and second levers and tending to bias said first lever into engagement with said second lever for movement therewith in an increasing fuel direction, means responsive to the speed of said output shaft and operably connected to control the position of said second lever in accordance with the speed of said output shaft, said output shaft speed responsive means including a control element movable to vary the speed setting of said output shaft speed responsive means whereby the operative position of said second lever is controlled in accordance with variations in the speed of said output shaft from said speed setting as determined by the position of said control element, a third lever engageable with and operable to carry said first lever in a decreasing fuel direction independently of the operative position of said second lever, and means for independently actuating said control element and said third lever to provide alternative control of the output shaft operating characteristic.

2. In a power plant including an engine and a power transmitting mechanism having an output shaft connectable to drive a variable load and having operating characteristics whereby the rate of operation of the output shaft tends to decrease under load more rapidly than the rate of operation of said engine, a control mechanism comprising a means for regulating the supply of fuel to said engine and including a control member movable between a minimum fuel supply control position and a full fuel supply control position, a first lever operably connected to move said control member between its minimum and full fuel supply positions, a first spring means biasing said first lever to carry said control member toward its full fuel supply position, a second lever engageable with and operable to limit the movement of said first lever and of said control member in a fuel decreasing direction, a second spring means interposed between said first and second levers and tending to bias said first lever for movement with said second lever in an increasing fuel direction, means responsive to the speed of said output shaft and operably connected to control the fuel supply limiting position of said second lever in accordance with the speed of said output shaft, said output shaft speed responsive means including a control element movable to vary the speed setting of said output shaft speed responsive means whereby the fuel supply limiting position of said second lever is controlled in accordance with variations in the speed of said output shaft to maintain the output shaft at a desired load driving speed corresponding to the position of said control element, means for selectively actuating said control element to establish the desired output shaft speed setting for the output shaft speed responsive means, a third lever engageable with and operable to limit the movement of said first lever in a fuel decreasing direction, and means for actuating said third lever independently of said control element actuating means to limit the output shaft speed responsive movement of said second lever in a fuel increasing direction and to carry said first lever in a fuel decreasing direction independently of the output shaft speed responsive operative position of said second lever.

3. In a power plant including an engine and a power transmitting mechanism having an output shaft drivingly connectable to a variable load and having operating characteristics whereby the rate of operation of the output shaft tends to decrease with the application of load more rapidly than the rate of operation of said engine, a control mechanism comprising means operable to regulate the supply of fuel to the engine and including a control member movable between a minimum fuel supply position and a full fuel supply position, a first lever means connected to and operable to move said control member between its minimum and full fuel supply positions, a first spring means biasing said first lever means to carry said control member toward its full fuel supply position, means responsive to the rate of operation of the engine and operably connected to bias said first lever means to carry said control member in a fuel decreasing direction in opposition to said first spring means to establish and maintain mimimum and maximum engine speed limits, a second lever means engageable with and operable to limit the movement of said first lever means and of said control member in a fuel decreasing direction, a second spring means interposed between said first and second lever means and tending to bias said first lever means for movement with said second lever means in an increasing fuel direction, means responsive to the speed of said output shaft and operably connected to control the fuel supply limiting position of said second lever means in accordance with the speed of said output shaft, said output shaft speed responsive means including a control element movable to vary the speed setting of said output shaft speed responsive means whereby the fuel supply limiting position of said second lever means is controlled in accordance with variations in the speed of said output shaft to maintain the output shaft at a desired load driving speed corresponding to the position of said control element, means for selectively actuating said control element to establish the desired output shaft speed setting for the output shaft speed responsive means, a third lever means engageable with and operable to limit the movement of said first lever means in a fuel decreasing direction, and means for actuating said third lever means independently of said control element actuating means to limit the output shaft speed responsive movement of said second lever means in a fuel increasing direction and to carry said first lever means in a fuel decreasing direction independently of the output shaft speed responsive operative position of said second lever means.

4. In a power plant including an engine and a power transmitting mechanism drivingly connected thereto having an output shaft connectable to drive a variable load and having operating characteristics whereby the rate of operation of the output shaft tends to decrease with the application of load more rapidly than the rate of operation of said engine, a control mechanism comprising, in combination, fuel supply means operable to supply variable amounts of fuel to the engine and including a control member movable between a fuel off position in which it conditions said supply means to shut off the supply of fuel to said engine, a minimum fuel supply position in which it conditions said fuel supply means to supply fuel to said engine at a restricted rate permitting engine operation at a low idling speed, and a full fuel supply position in which it conditions said fuel supply means to supply fuel to said engine sufficient to permit engine operation under maximum speed and load conditions, a first spring means biasing said control member toward its full fuel supply position, means responsive to the rate of operation of the engine and operably connected to said control member to move said member in a fuel decreasing direction in opposition to said first spring means to establish and maintain minimum and maximum engine speed limits, a first lever means connected to and operable to move said control member between said minimum and full fuel supply positions, a second lever means engageable with and operable to carry said first lever means in a decreasing fuel direction, a second spring means interposed between said first and second lever means and tending to bias said first lever means into engagement with said second lever means whereby said first lever means tends to follow movement of said second lever means in an increasing fuel direction, means responsive to the speed of said output shaft and connected to and operable to move said second lever means in accordance with the speed of said output shaft to control movement of said control member between a position intermediate its minimum and full fuel supply positions wherein the fuel supply means is conditioned to supply fuel to said engine at a rate in excess of that permitting engine idle speed operation and its full fuel supply position, said output shaft speed responsive means including a control element movable through an operating zone to vary the speed responsive setting of said output shaft speed responsive means whereby the operative position of said second lever means is controlled in accordance with variations in the speed of said output shaft from said speed setting as determined by the position of said control element in said operating zone, a third lever means engageable with said first lever means to carry said first lever means in a decreasing fuel direction independently of the operative position of said second lever means and operable through said first lever means to carry said control member from said intermediate position to its minimum fuel supply control position, a third spring means normally biasing said third lever means to carry said first lever means toward its minimum fuel control position, independent manually operable means for selectively actuating said control element and said third lever means to control the desired output shaft operating characteristic, and a fourth lever means operable to carry said fuel control member to its fuel off position independently of the operative position of said second and third lever means.

References Cited in the file of this patent

UNITED STATES PATENTS

| | | |
|---|---|---|
| 1,868,130 | Bauer et al. | July 19, 1932 |
| 2,268,470 | Orton | Feb. 17, 1953 |
| 2,657,918 | Parker | Nov. 3, 1953 |
| 2,861,559 | Reiners | Nov. 25, 1958 |